A. EICHLER AND C. JENSEN.
AUTOMOBILE WHEEL PULLER.
APPLICATION FILED JUNE 26, 1919.
1,361,975.
Patented Dec. 14, 1920.
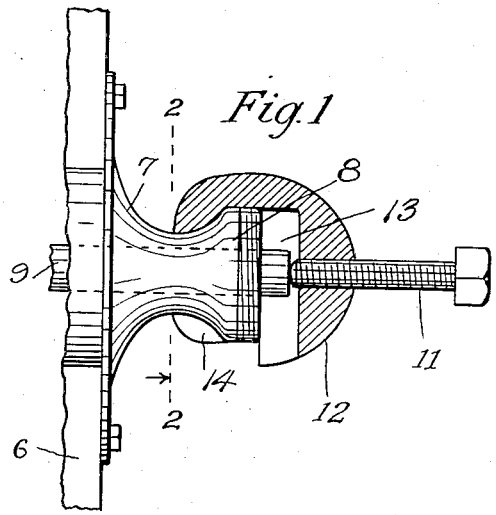
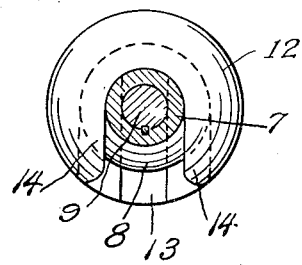
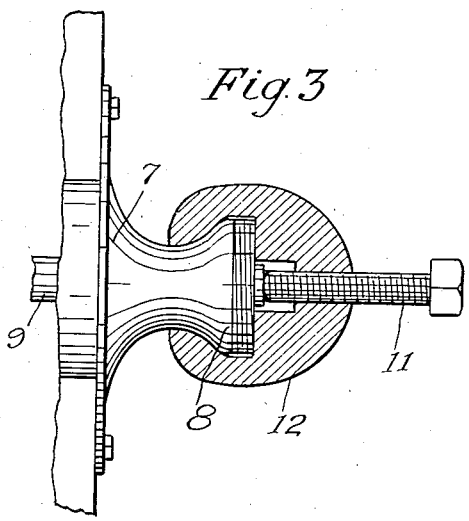
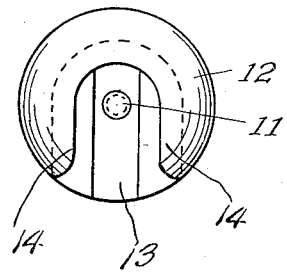
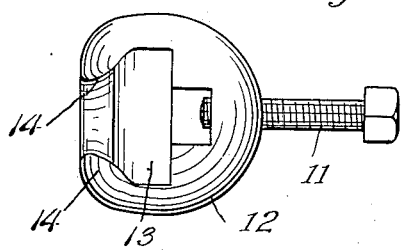
Inventors:
Chris Jensen,
Albert Eichler

UNITED STATES PATENT OFFICE.

ALBERT EICHLER AND CHRIST JENSEN, OF MINNEAPOLIS, MINNESOTA.

AUTOMOBILE-WHEEL PULLER.

1,361,975. Specification of Letters Patent. Patented Dec. 14, 1920.

Application filed June 26, 1919. Serial No. 307,004.

*To all whom it may concern:*

Be it known that we, ALBERT EICHLER and CHRIST JENSEN, citizens of the United States of America, residing at the city of Minneapolis, in the county of Hennepin and State of Minnesota, have invented a new and useful Automobile-Wheel Puller, of which the following is a specification.

Our invention has for its object to provide an extremely simple and highly efficient wheel puller for automobile or vehicle wheels, which have annular flanges or enlarged portions at the outer ends of their hubs.

Certain well known automobiles, which have wheel hubs of the character above noted, are as follows: the Buick, the Page, the Chevrolet, the Dort, the Chandler, the Gardner, the Oakland, the Auburn, and the Scripps Booth.

Our improved wheel puller is composed of but two elements, to wit: a recessed head and a screw working with threaded engagement with said head. The recess or channel in said head is open at one side of the head and is formed with opposing laterally spaced gripping flanges for engagement with the flange of the wheel hub when the head is simply dropped downward onto the hub, so as to axially aline the screw with the shaft or axle on which the wheel is mounted.

The invention is illustrated in the accompanying drawing, wherein like characters indicate like parts throughout the several views.

Referring to the drawings:

Figure 1 is a fragmentary view showing a wheel hub and axle in side elevation and the puller head in axial vertical section;

Fig. 2 is a section on the line 2—2 of Fig. 1;

Fig. 3 is a view corresponding to Fig. 1, but showing the puller head in horizontal axial section;

Fig. 4 is a bottom plan view of the puller removed from working position; and

Fig. 5 is an elevation looking at the inner side or face of the puller.

The numeral 6 indicates a wheel having a hub 7 with an outstanding annular end flange or enlargement 8 that is externally threaded to receive a hub cap, not shown. The numeral 9 indicates the shaft or axle, on which the wheel is mounted.

The puller screw 11 works with threaded engagement through the back of the puller head 12, which latter is preferably a cast structure. Said head 12 is formed with an approximately diametric channel 13 that is open at one side, preferably at the bottom, of the head, and is formed with opposing laterally spaced gripping flanges 14. The channel 13 and flanges 14 are so designed that they will permit the head to slip downward over the enlarged outer end or flange 8 of the hub with the flanges 14 engaging the reduced portion of the hub and gripping the outer end of the hub so that the puller head cannot be forced off the hub by axial movement. When the head is applied in working position, as shown in the drawings, the screw 11 will be alined for engagement with the outer end of the shaft 9, so that by turning the screw inward, the puller head will be drawn outward and the wheel will be drawn from the shaft.

This device, while extremely simple and of very small cost, has, in practice, been found highly efficient for the purpose had in view. It has no parts to get out of order and may be very quickly applied in working position on the hub and removed therefrom.

What we claim is:

A wheel puller comprising a recessed head having a channel with opposing laterally spaced gripping flanges, said channel being open at one side of said head, so that said head may be dropped into interlocking engagement with a wheel hub having an outer end flange, and a screw working axially through said head.

ALBERT EICHLER.
CHRIST JENSEN.